United States Patent [19]

Nakayama et al.

[11] Patent Number: 5,068,146
[45] Date of Patent: Nov. 26, 1991

[54] POLYMERIZED FILMS, MEDIUM RELATED MEMBERS, AND PROCESS FOR MAKING

[75] Inventors: Masatoshi Nakayama; Kunihiro Ueda; Masatoshi Okamura, all of Saku, Japan

[73] Assignee: TDK Corporation, Tokyo, Japan

[21] Appl. No.: 318,260

[22] Filed: Mar. 3, 1989

[30] Foreign Application Priority Data

Mar. 3, 1988 [JP] Japan ................................. 63-50428

[51] Int. Cl.$^5$ ......................... B32B 15/08; B05D 3/06; B05D 3/14
[52] U.S. Cl. ...................................... 428/336; 427/38; 427/47; 428/457; 428/900
[58] Field of Search ................ 428/141, 900, 336, 457; 427/38

[56] References Cited

U.S. PATENT DOCUMENTS 4,880,687 11/1989 Yokoyama et al. ............ 428/900 X
4,889,767 12/1989 Yokoyama et al. ................. 428/336

*Primary Examiner*—Thomas J. Herbert, Jr.
*Attorney, Agent, or Firm*—Oblon, Spivak, McClelland, Maier & Neustadt

[57] ABSTRACT

A plasma-polymerized film is formed by depositing and polymerizing a metal element-containing material forming an electrode and a gaseous polymerizable carbon-containing reactant in a plasma atmosphere. The polymerized film contains the metal element Mt and carbon C in an atomic ratio Mt/(C+Mt) of at least 1/100. The polymerized film is prepared under a condition W/(F.M) of at least $10^8$ joule/kg wherein W is a power applied for plasma generation in joule/sec., F is a flow rate of the gaseous reactant, and M is the molecular weight of the gaseous reactant, F.M being expressed in kg/sec. Such a polymerized film is advantageously applied as a coating to a surface of a member which constructs or is disposed in a casing in which a tape or disk-shaped medium is received for travel or rotating motion.

8 Claims, 3 Drawing Sheets

POLYMERIZED FILMS, MEDIUM RELATED MEMBERS, AND PROCESS FOR MAKING

BACKGROUND OF THE INVENTION

1. Field of the Invention

This invention relates to polymerized films and a process for making the same. More particularly, it relates to a plasma-polymerized film which is formed by depositing and polymerizing a metal element-containing material forming an electrode and a gaseous polymerizable carbon-containing reactant.

This invention also relates to members for use with media capable of recording and/or reproduction of information utilizing magnetism, light or the like, for example, casings or cartridges for video tape, audio tape and computers, the members having a polymerized film as a surface coating, and a process for making the same.

2. Discussion of Prior Art

Technology utilizing polymerized films, especially thin films has been of increasing importance in these days. A variety of processes are available to form thin films. Among others, a vacuum thin film forming process is one of the most important techniques critical in the information, electron, watch and optical (such as camera) industries. Great research efforts have been made on thin films and their preparation as well as their application, and new films and processes have been continuously developed.

Among various films, plasma-polymerized films draw attention to their excellent film properties and are used in a variety of applications. However, since organic gases are generally used as the reactant gas to form such plasma-polymerized films, the resulting films are organic films which are believed difficult to modify their properties as by imparting electric conductivity.

The inventors proposed to form a plasma-polymerized, metal-containing film using a gaseous organometallic monomer as reactant gas (see Japanese Patent Application Kokai No. 222115/1983).

The film is a modified film in that antistatic and other properties are imparted to a conventional plasma-polymerized film. However, the reactant used in this process is not necessarily available in plenty and it is difficult to change the ratio of carbon to metal in the reactant as desired. The type and content of metal in the thin film are somewhat limited. It is less feasible to change the basic nature, typically electric conductivity and antistatic function of the thin film as desired.

Japanese Patent Application Kokai No. 88829/1983 proposes a magnetic recording medium comprising a polymerized, metal-containing, carbon fluoride base film and a method for making the same.

According to the disclosure, a medium having a protective film having improved durability and corrosion resistance is provided as well as its preparation. However, it is difficult to increase the content of metal element in a film under conditions within the range described in the disclosure (that is, $W/(F \cdot M) \simeq 10^7$ Joule/kg as later defined) until electric conductivity is imparted to the film, and it is also difficult to change the metal element content as desired.

Generally speaking, various information recording/reproducing carriers including video cassettes, audio cassettes, computer cartridges, video floppy disks, and laser vision disks are of the design that a tape or disk-shaped recording/reproducing medium is received in a casing such that the medium may travel or rotate in the casing or recording/reproducing equipment. More particularly, within these recording/reproducing carriers, the recording/reproducing medium moves in sliding contact with members constructing the casing, and members in the casing make mutual slide contact during movement.

In the case of video tape cassettes, for example, the cassette casing has received therein a recording medium in the form of video tape and various members including reels on which the tape is wound, brakes for locking the reels, and guide posts and tape guides for guiding the tape during operation.

When the recording/reproducing equipment is loaded with the medium and operated, the video tape makes slide contact with the tape travel guide members such as guide posts and tape guides, and the reels make contact with reel-retaining leaf springs.

To ensure that the travel or rotation of the medium in the form of tape or disk be accurate, smooth and stable, these members have to meet the following requirements:

(A) a low coefficient of friction, (B) sufficient abrasion resistance and surface hardness to minimize abrasion of the members and the tape which would cause dropouts, and (C) antistatic properties to prevent static electrification which would cause recording/reproducing malfunctions.

In the prior art, these members are formed from resinous material because of ease of molding and lightweight and they are provided with antistatic coatings on the surface, replaced by abrasion resistant metal parts for the necessary portions, or provided with metal coatings.

However, formation of an antistatic coating has problems including difficulty of coating a uniformly thin film and blooming. Partial replacement of the members by metal parts has problems including an increased number of steps, increased cost, and difficulty of processing a complex shape.

Under the circumstances, the inventors previously proposed to form a plasma-polymerized film of organometallic compound (Japanese Patent Application Kokai No. 222115/1983) and silicon compound (Japanese Patent Application Kokai No. 222438/1983) on such members.

For these films, nevertheless, only antistatic property is taken into account while no evaluation is made on friction during operation.

OBJECT OF THE INVENTION

An object of the present invention is to provide a plasma-polymerized film which is capable of changing the type and content of metal in the thin film as desired, capable of changing the basic nature, for example, electric conductivity of the thin film as desired, easy to control the thickness, and inexpensive to manufacture, as well as a process for making the same.

Another object of the present invention is to provide a member for use with a recording/reproducing medium, which is highly antistatic and durable, ensures accurate, smooth and stable operation of the medium, causes minimized dropouts upon recording/reproducing operation, and invites no further increase of part and step numbers, as well as a process for making the same.

SUMMARY OF THE INVENTION

These objects are achieved by the present invention as defined below.

According to the present invention, there is provided a plasma-polymerized film which is formed by depositing and polymerizing a metal element-containing material forming an electrode and a gaseous polymerizable carbon-containing reactant in a plasma atmosphere, characterized in that the film contains the metal element Mt and carbon C in an atomic ratio Mt/(C+Mt) of at least 1/100.

According to a second aspect of the present invention, there is provided a process for preparing a plasma-polymerized film comprising passing a gaseous polymerizable carbon-containing reactant between electrodes formed of a metal element-containing material, and depositing and polymerizing the metal element-containing material and the polymerizable carbon-containing reactant in a plasma atmosphere, characterized in that formation of the plasma-polymerized film is carried out under a condition W/(F·M) of at least $10^8$ Joule/kg wherein W is a power applied for plasma generation in Joule/sec., F is a flow rate of the gaseous reactant, and M is the molecular weight of the gaseous reactant, F·M being expressed in kg/sec.

According to a third aspect of the present invention, there is provided a medium related member which constructs or is disposed in a casing in which a tape or disk-shaped medium is received for travel or rotating motion, characterized in that a plasma-polymerized, metal element-containing film is formed on a surface of said member by depositing and polymerizing a metal element-containing material forming an electrode and a gaseous polymerizable carbon-containing reactant in a plasma atmosphere.

According to a fourth aspect of the present invention, there is provided a process for preparing a medium related member which constructs or is disposed in a casing in which a tape or disk-shaped medium is received for travel or rotating motion, comprising forming a plasma-polymerized film on a surface of said member, characterized in that said plasma-polymerized film is formed by passing a gaseous polymerizable carbon-containing reactant between electrodes formed of a metal element-containing material, and depositing and polymerizing the metal element-containing material and the polymerizable carbon-containing reactant in a plasma atmosphere, thereby forming a metal element-containing plasma-polymerized film on the member surface.

In the figure, numerals designate the following parts.
1: polymerized film preparing apparatus,
2: substrate,
31, 35: electrodes,
4: AC and frequency variable power supply, →B: direction of magnetic field (arrow), g: distance of the gap between electrodes.

Figure 2:
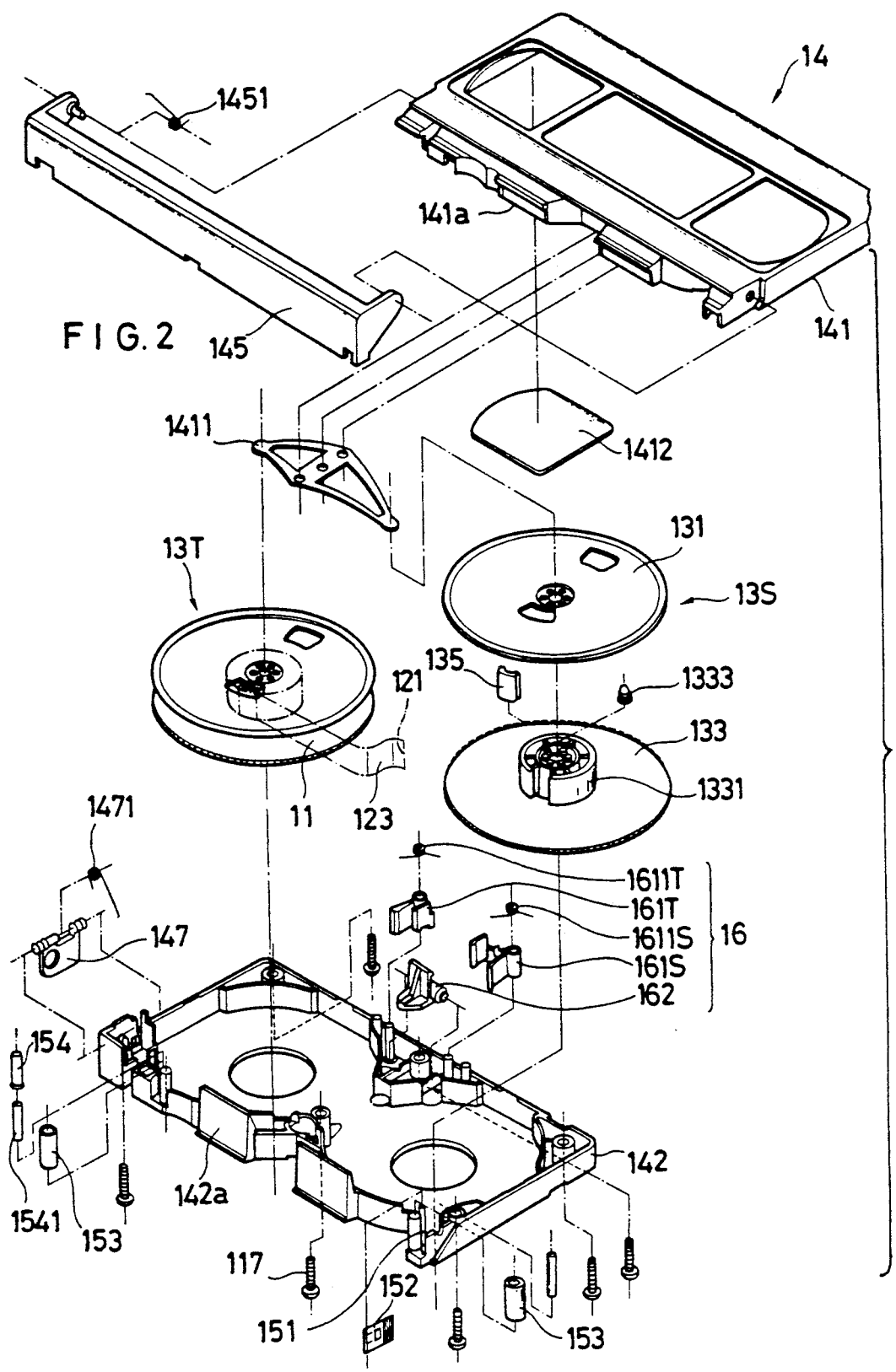

FIG. 2 is a perspective exploded view showing the structure of a VHS video cassette using a medium related member according to the present invention.

In the figure, numerals designate the following parts.
11: recording tape,
121: leader/trailer tape,
123: adhesive tape,
13S: supply reel,
13T: take-up reel,
131: reel flange,
133: reel hub,
1331: hub portion,
1333: reel center boss,
135: tape clamp,
141: upper cassette half,
1411: reel-retaining leaf spring,
1412: clear window,
142: lower cassette half,
145: guard panel,
1451: guard panel spring,
147: lock plate,
1471: lock plate spring,
151: guide post,
152: tape pad,
153: tape guide,
154: guide roller,
1541: guide roller pin,
161: brake lever,
1611: brake spring,
162: release lever.

Figure 3:
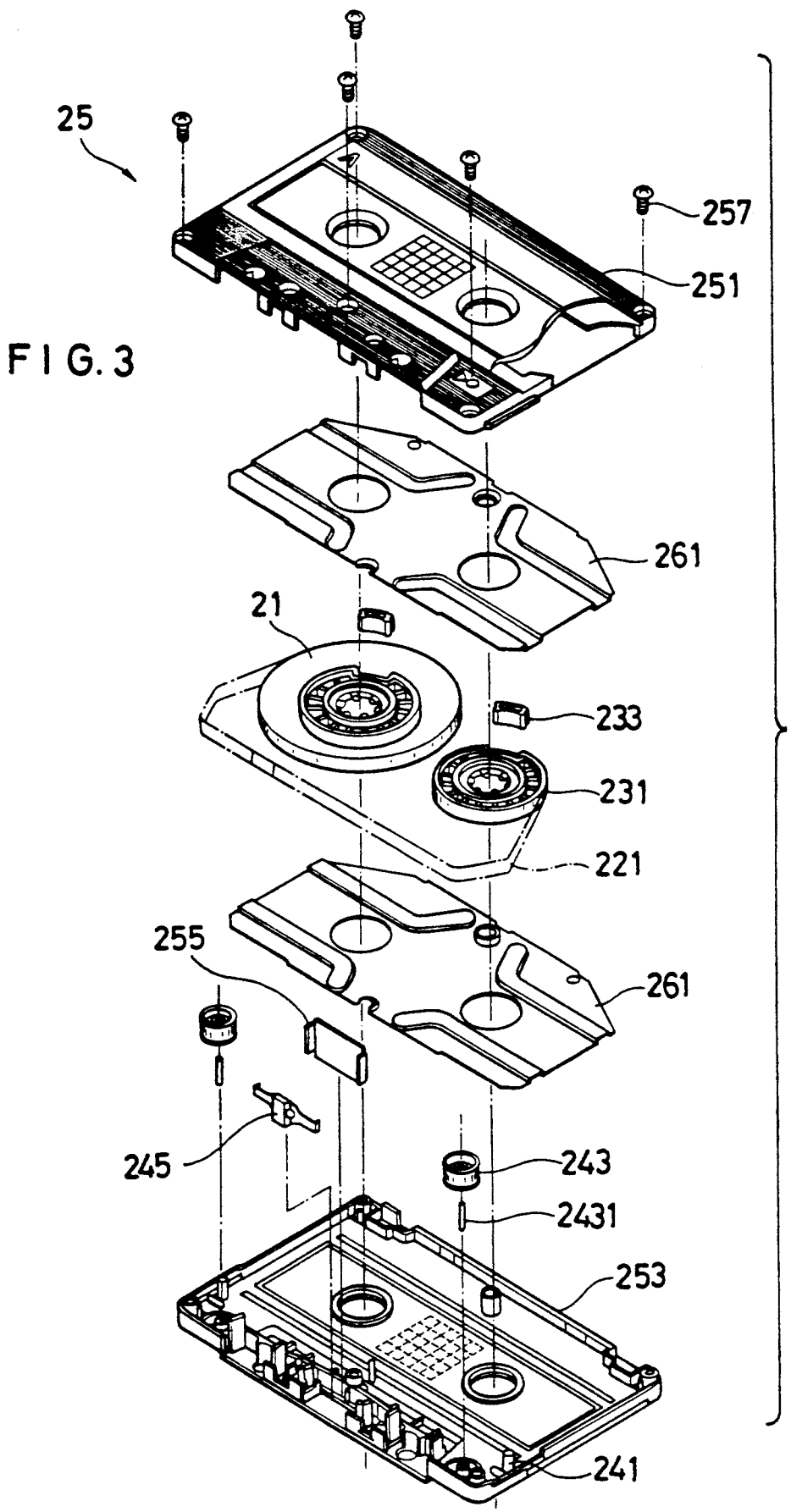

FIG. 3 is a perspective exploded view showing the structure of an audio cassette using a medium related member according to the present invention.

In the figure, numerals designate the following parts.
21: recording tape,
211: leader tape,
231: hub,
233: clamp,
241: guide pin,
243: guide roller,
2431: guide roller pin,
245: head pad,
251: half side A,
253: half side B,
255: shield plate,
257: tapping screw,
261: sheet.

DETAILED DESCRIPTION OF THE INVENTION

The invention will be described in detail. The plasma-polymerized film of the present invention is formed by depositing and polymerizing a metal element-containing material forming an electrode and a gaseous polymerizable carbon-containing reactant in a plasma atmosphere.

The polymerized film thus contains the metal element Mt and carbon C in an atomic ratio Mt/(C+Mt) of at least 1/100, preferably from 5/100 to 99.9/100. With a ratio Mt/(C+Mt) of less than 1/100, the polymerized film cannot have an electronic function such as conductivity. In the practice of the present invention, the ration Mt/(C+Mt) may be suitably changed and determined so as to provide the desired electronic function.

In general, the content of metal element Mt in the film ranges from about 0.5 to about 99.5 atom%. Plasma-polymerized films having a metal element content in such a range may be established under the plasma polymerization conditions described later. The film may contain one or more metal elements.

The thickness of the film is not particularly limited and may be suitable determined depending on the intended application. It is generally about 10 to 1,000 Å thick when used as a coating on medium related members as will be described later.

The metal element-containing material which is used to form electrodes according to the present invention includes a variety of elemental metals, alloys, and metal compounds.

Examples of the elemental metals include Cu, Al, Fe, Co, Ni, Ga, Mg, Ti, Mn, Zn, Se, Ag, Cd, In, Sn, Au, Pb, Mo, W, Cr, B, Be, Bi, Hf, Nb, Pd, Pt, Sb, Si, Ta, Te, V, Zr, and Tl as well as rare earth metals such as Sc, Y, La, Ce, Pr, Nd, Pm, Sm, Eu, Gd, Tb, Dy, Ho, Er, Tm, Yb, and Lu.

Examples of the alloys include Mn-Al, Co-Ni, Co-Cr, Co-Fe, Al-Cu, Al-Si, Cu-Sn, Ge-Ta, Au-Ge, Cu-Zr, Cu-Mn, Cr-Si, In-Sn, Ni-Cr, Sb-In, Fe-Dy, Fe-Tb, Fe-Ni, Fe-P, Li-Al, Li-Bi, Sb-Sn, Mo-Si, Li-Sn, Li-Ca, Li-Cu, Li-In, Li-Si, Ni-P, Ti-Si, Pb-Sn, Cd-Te, Co-Nb, Co-P, Co-Ta, Co-Zr, Co-Gd, Cu-Bi-Mn, Ni-Fe-Cr, Co-Fe-Nb, Co-Fe-Zr, Co-Mo-Zr, Co-Ta-Zr, Fe-Al-Si, Fe-Dy-Si, Co-B-Fe-Si, Fe-Al-Ni-Si, and Fe-B-Co-Si.

Examples of the metal compounds include fluorides such as $AlF_3$, $BaF_2$, $BiF_3$, $CaF_2$, $CdF_3$, $LaF_3$, $LiF$, $MgF_2$, $NaF$, and $YF_3$;

oxides such as $Al_2O_3$, $As_2O_3$, $B_2O_3$, $Bi_2O_3$, $CdO$, $CaO$, $CeO$, $CeO_2$, $Cr_2O_3$, $CoO$, $Eu_2O_3$, $Er_2O_3$, $GeO_2$, $HfO_2$, $In_2O_3$, $Fe_2O_3$, $La_2O_3$, $MgO$, $MnO_2$, $MoO_3$, $Nb_2O_5$, $Ho_2O_3$, $Nd_2O_3$, $NiO$, $Nd_2O_5$, $PbO$, $Sb_2O_3$, $SiO$, $SiO_2$, $SeO_2$, $SnO_2$, $Ta_2O_5$, $Tm_2O_3$, $TiO_2$, $TeO_2$, $WO_3$, $V_2O_5$, $Y_2O_3$, $Yb_2O_3$, $ZnO$, $ZrO_2$, $Pr_6O_{11}$, $Sm_2O_3$, $Tb_4O_7$, $BaTiO_3$, $BiTiO_3$, $CaO-Y_2O_3$, $Cr-SiO$, $In_2O_3$-$SnO_3$, $LiTaO_3$, $LiNbO_4$, $PbTiO_3$, $PbZrO_3$, $SnO_2$-$Sb_2O_3$, $ZrO_2$-$Co$, $ZrO_2$-$SiO_2$, $Ta$-$SiO_2$, $WO3$-$Nb_2O_5$, $WO_3$-$TiO_3$, and $In_2O_3$-$SnO_2$;

sulfides such as $As_2S_3$, $Bi_2S_3$, $CdS$, $Cu_2S$, $Ga_2S$, $HgS$, $In_2S_3$, $PbS$, $MoS_2$, $NiS$, $SnS$, $TaS_2$, $TiS_2$, $WS_2$, $ZnS$, and $Sb_2S_3$;

selenides such as $As_2Se_3$, $Bi_2Se_3$, $CdSe$, $PbSe$, $Sb_2Se_3$, $SnSe$, and $ZnSe$;

tellurides such as $Bi_2Te_3$, $CdTe$, $Ca_2Te$, $GeTe$, $SnTe$, and $ZnTe$;

nitrides such as $AlN$, $BN$, $NbN$, $Si_3N_4$, $TaN$, $TiN$, $VN$, $ZrN$, and $TiCN$;

carbides such as $Al_4C_3$, $B_4C$, $Cr_3C_2$, $HfC$, $Mo_2C$, $NbC$, $SiC$, $TaC$, $TiC$, $WC$, $VC$, and $ZrC$;

borides such as $AlB_2$, $CrB_2$, $HfB_2$, $LaB_2$, $LaB_6$, $MoB_2$, $NbB_2$, $TaB_2$, $TiB_2$, $WB$, $VB_2$, and $ZrB_2$; and other compounds such as InAs, InGa, InP, GaAs, GaP, InSb, GaSb, $ZnP_2$, $Zn_3P_2$, $TlCO_3$, $TlNO_3$, and $BaTiO_3$.

The electrodes may be of a metal alone or they may be formed by baking metal-containing ceramic, ferrite or similar material onto metal material electrodes.

In the practice of the present invention, the atomic ratio $Mt/(C+Mt)$ may be measured by the secondary ion mass spectroscopy (SIMS). The SIMS analysis involves measuring the profiles of C and Mt while ion etching with Ar or the like, and calculating their average values for the layer from which the ratio $Mt/(C+Mt)$ is obtained.

The ratio may be calculated from the counts of metal element Mt and carbon C using their detection sensitivity ratio as a correction factor.

With respect to the SIMS measurement, reference is made to the article entitled "SIMS and LAMMA" in Hyomen Kagaku Kiso Kouza, 1984, vol. 3, Hyomen Bunseki No Kiso To Ouyou (Surface Science Basic Lectures, Vol 3, 1984, Fundamentals and Applications of Surface Analysis, page 70).

It is SIMS that can take measurements at the highest sensitivity over a wide range of composition although Auger spectroscopy, electron spectroscopy for chemical analysis (ESCA) and similar analysis may also be employed for measurement.

The gaseous polymerizable reactant which can be used in forming the polymerized film according to the present invention is not particularly limited and a variety of gaseous organic reactants may be used. Preferred among them are those reactants which are gaseous at room temperature because of ease of operation.

A mixture of two or more different gaseous organic reactants is also employable. Then F and M defined later are given by the total of the reactants.

The gaseous reactants which can be used herein include a variety of well-known gaseous organic reactants which are plasma polymerizable.

Their examples are given below:

hydrocarbons, for example, methane, ethane, propane, butane, pentane, ethylene, propylene, 1-butene, 2-butene, 1,2-butadiene, 1,3-butadiene, acetylene, methylacetylene, propadiene, 1,7-octadiene, 1,3,5-hexatriene, benzene, styrene, naphthalene, vinyl naphthalene, cyclohexadiene, 2-methylpropene, cyclopentene, cyclohexene, and 2-vinyl-1,3-butadiene;

fluorocarbons, for example, tetrafluoromethane, octafluoropropane, octafluorocyclobutane, tetrafluoroethylene, and hexafluoropropylene;

fluorinated hydrocarbons, for example, fluoromethane, difluoromethane, trifluoromethane, difluoroethane, and tetrafluoroethane;

organic amino compounds, for example, amines, imines, amides, and imides such as methylamine, dimethylamine, trimethylamine, ethylamine, diethylamine, triethylamine, n-propylamine, di-n-propylamine, tri-n-propylamine, n-butylamine, n-amylamine, n-hexylamine, laurylamine, ethylenediamine, trimethylenediamine, hexamethylenediamine, ethanolamine, diethanolamine, allylamine, aniline, alanine, N-methylaniline, allyldimethylamine, 2-aminoethylether, 1-dimethyl-amino-2chloroethane, cyclopropylamine, cyclohexylamine, allylamine, allylmethylamine, allyldimethylamine, ethyleneimine, 1-methylethyleneimine, N,N-dimethylformamide, formamide, capronamide, aminoacetal, benzylamine, piperidine, pyrrolidine, and morpholine;

organic silicon compounds, for example, trimethylchlorosilane, trimethylmethoxysilane, vinyldimethylchlorosilane, methylchloromethylmethoxychlorosilane, methyldichlorosilane, dimethyldimethoxysilane, vinylmethyldichlorosilane, vinyltrimethoxysilane, tetramethoxysilane, tetraethoxysilane and organosiloxanes in the form of a mixture of hydrolyzates thereof; and other organic unsaturated compounds, for example, vinyl chloride, vinylidene chloride, acrolein, allyl alcohol, maleic acid, acrylic acid, methyl methacrylate, cyclohexenol, phthalic acid, phenol, aniline, methylaniline, dichlorobenzene, benzaldehyde, pyridine, and thiophene.

The film may further contain H, N, O, F, S, B, Si or the like.

Figure 1:
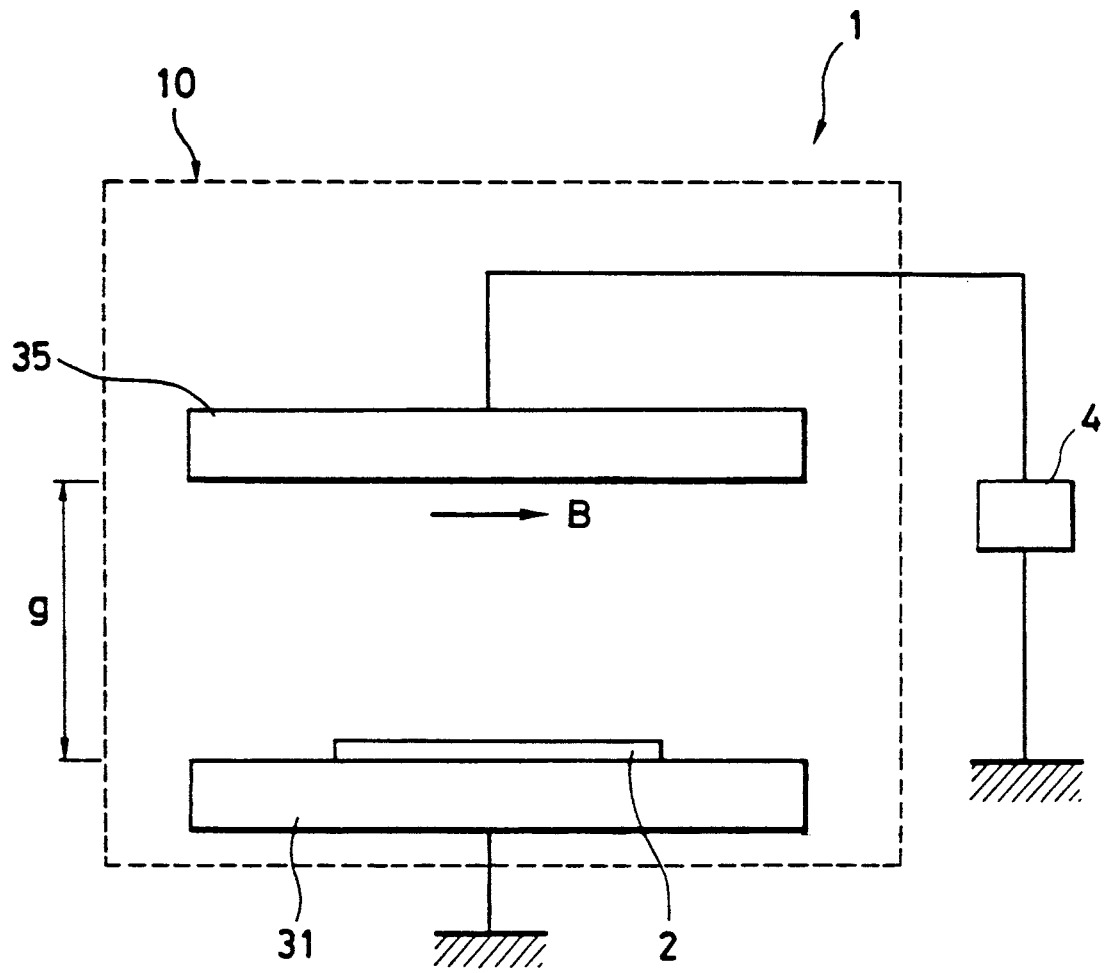
FIG. 1 is a schematic view of an apparatus for preparing a polymerized film according to the present invention.

FIG. 1 is a schematic view illustrating a polymerizing apparatus which is used in forming a polymerized film according to the present invention.

A gaseous polymerizable reactant as mentioned above is passed through a predetermined gap space between electrodes 31 and 35. AC high voltage is applied between the electrodes by a radio frequency power source, for example.

The electrode 35 is connected to a variable frequency power supply 4 while the other electrode 31 is grounded. The power supply and grounding connections may be reversed. Application of a biasing potential is also contemplated. During polymerization, the electrode 35 also serves the function of a source material for supplying a metal element which is incorporated into the plasma-polymerized film. When plasma polymerization is carried out under the conditions described later, the metal element forming the electrode is incorporated into the polymerized film. In FIG. 1, a section 10 delimited by broken lines is generally confined within a vacuum tank.

The plasma-polymerized film is formed under the following conditions. More particularly, it is preferred to carry out plasma polymerization under a condition $W/(F \cdot M)$ of at least $10^8$ joule/kg, especially at least $10^9$ joule/kg wherein W is a power applied for plasma generation in joule/sec., F is a flow rate of the gaseous organic reactant, and M is the molecular weight of the gaseous reactant, $F \cdot M$ being expressed in kg/sec. With a $W/(F \cdot M)$ value of lower than $10^8$ joule/kg, it is difficult to fully incorporate the metal element into the plasma-polymerized film from the electrode. It is to be noted that Japanese Patent Application Kokai No. 88829/1983 uses a $W/(F \cdot M)$ value of $10^7$ joule/kg, under which condition a film having an $Mt/(C+Mt)$ ratio of at least 1/100 can be formed with difficulty. The electrodes 31 and 35 shown in FIG. 1 may have any desired surface area. The distance of the gap between the electrodes 31 and 35 (the distance shown at g in FIG. 1) may be selected depending on the output of the plasma power supply and the electrode configuration so as to achieve the most efficient deposition.

The flow rate of the gaseous polymerizable reactant which is fed between the electrodes depends on the output of the plasma power supply and may be selected so that the value of $W/(F \cdot M)$ fall within the above-defined range.

The plasma generating power source used herein may be a RF power source, microwave power source, DC power source, or AC power source.

The operating pressure in the vacuum tank may be in the range of 0.05 Pa to 5 Pa. Under an operating pressure of higher than 5 Pa, little metal element is incorporated into the plasma-polymerized film because of the reduced mean free path. It is difficult to generate a stable plasma and hence to efficiently form a polymerized film under an operating pressure of lower than 0.05 Pa.

In the practice of the present invention, the so-called cross electric/magnetic field arrangement is especially preferred in which a magnetic field is applied perpendicular to the electric field in the plasma atmosphere as shown in FIG. 1 (where a magnetic field B is applied in the arrow direction).

Application of a magnetic field during plasma polymerization allows more metal element to be incorporated into the plasma-polymerized film than would be possible in the prior art.

Coaxial magnetron and plate magnetron systems are known as such a system, but not particularly limited.

The intensity of magnetic field at the surface of a substrate is of the order of 10 to 10,000 G.

It is easy to provide the film with a change or gradient in concentration distribution of metal Mt in a direction of film thickness by controlling the parameters, $W/(F \cdot M)$, gaseous reactant flow rate, gaseous reactant composition, and operating pressure upon film formation.

The carrier gas used herein may be Ar, $N_2$, He, $H_2$ or the like.

In addition to the gaseous polymerizable reactant mentioned above, one or more reactive gases such as $H_2$, $O_2$, $O_3$, $H_2O$, $N_2$, NOx such as NO, $N_2O$, and $NO_2$, $NH_3$, CO, and $CO_2$ may be added as an additional gas.

The molecular weight of these reactive gases and carrier gases is not accounted for as the molecular weight M of the gaseous polymerizable reactant in calculating the value of $W/(F \cdot M)$.

The principle of plasma treatment will be briefly described. When an electric field is applied to a gas kept at a reduced pressure, free electrons which are present in a minor proportion in the gas and have a remarkably greater inter-molecular distance than under atmospheric pressure are accelerated under the electric field to gain a kinetic energy (electron temperature) of 5 to 10 eV. These accelerated electrons collide against atoms and molecules to fracture their atomic and molecular orbitals to thereby dissociate them into normally unstable chemical species such as electrons, ions, neutral radicals, etc. The dissociated electrons are again accelerated under the electric field to dissociate further atoms and molecules. This chain reaction causes the gas to be instantaneously converted into highly ionized state. This is generally called a plasma gas. Since gaseous molecules have a less chance of collision with electrons and absorb little energy, they are kept at a temperature approximate to room temperature. Such a system in which the kinetic energy (electron temperature) of electrons and the thermal motion (gas temperature) of molecules are not correlated is designated a low temperature plasma. In this system, chemical species set up the state capable of additive chemical reaction such as polymerization while being kept relatively unchanged from the original. The present invention utilizes this state to form a plasma-polymerized film on a substrate. The use of a low temperature plasma avoids any thermal influence on the substrate.

The present invention also provides a medium related member which constructs or is disposed in a casing in which a tape or disk-shaped medium is received for travel or rotating motion, wherein a plasma-polymerized, metal element-containing film as defined above is formed on a surface of the member by depositing and polymerizing a metal element-containing material forming an electrode and a gaseous polymerizable carbon-containing reactant in a plasma atmosphere.

FIG. 2 illustrates one embodiment in which the medium related member of the invention is applied to a video tape cassette.

In this embodiment, the medium is a length of magnetic tape 11 having a magnetic layer on a flexible substrate and the casing is a cassette 14.

The video cassette 14 shown in FIG. 2 includes upper and lower cassette halves 141 and 142 and a guard panel 145 assembled by means of tapping screws 117. These members form the casing according to the present invention. Disposed within the cassette 14 are a supply reel 13S having the tape wound thereon, a take-up reel 13T for taking up the tape, and a brake assembly 16 for preventing rotation of the reels 13 except operating periods. There are disposed many other members including travel guide members including tape guides 153 and guide rollers 154.

The supply and take-up reels 13S and 13T are juxtaposed in the cassette and biased against the lower cassette half 142 by a leaf spring 1411. The brake assembly 16 is disposed above and intermediate the reels. The tape travel guide members including tape guides 153 and guide rollers 154 are disposed near outlet and inlet ports through which the tape is pulled out of and into the cassette.

Further, a leader/trailer tape section 121 is to connect the magnetic tape 11 to the supply reel 13S.

The magnetic tape 11 from the supply reel 13S is extended between a guide post 151 and a tape pad 152 under a moderate back tension imparted by the tape pad 152, and pulled into the recording/reproducing equipment through the tape outlet port in contact with the tape guide 153.

The tape which has traveled past the recording/reproducing equipment is passed between the tape guide 153 and the guide roller 154 and then wound up on the take-up reel 13T.

In the video cassette generally has a structure as illustrated above, most of the members constructing the cassette make slide contact with the recording tape 11 or with each other.

According to the present invention, a desired plasma-polymerized film is formed on surfaces of members constructing the video cassette. Among them, those members which are expected of better performance when coated with the desired plasma-polymerized film on their surface are the travel guide members in contact with the recording tape 11 including guide post 151, tape pad 152, tape guide 153, and guide roller 154, leader/trailer tape section 121 connected to the recording tape 11, a reel center boss 1333 in contact with the leaf spring 1411, and front end portions 141a and 142a of upper and lower cassette halves 141 and 142.

FIG. 3 illustrates another embodiment in which the medium related member of the invention is applied to an audio tape cassette.

In this embodiment, the medium is a length of magnetic tape 21 having a magnetic layer on a flexible substrate and the casing is a cassette 25 like the video cassette.

The audio cassette 25 shown in FIG. 3 includes A and B side cassette halves 251 and 253 assembled. These members form the casing according to the present invention. Disposed within the cassette 25 are hubs 231, 233 on which the tape is wound or unwound, and guide rollers 243 and guide pins 241 for guiding the tape during its travel. There are disposed many other members including sheets 261 assisting in tight, accurate, smooth, antistatic winding and unwinding of the tape, and leader tape sections 221 connecting the magnetic tape 21 to the hubs 231, 233.

The tape from one hub 231 is extended along the travel path via the guide pin 241 and guide roller 243 and enters an operation zone where it is brought in contact with a head of the recording/reproducing equipment. A head pad 245 forces the tape in slide contact with the head. Then the tape is extended along the travel path via the guide pin 241 and guide roller 243 and wound on the other hub 231.

According to the present invention, a desired plasma-polymerized film is formed on surfaces of members constructing the audio cassette as in the case of the video cassette. Among them, those members which are expected of better performance when coated with the desired plasma-polymerized film on their surface are the travel guide members including guide pins 241 and guide rollers 243, leader tape sections 221, and sheets 262.

The present invention is effectively applicable to not only the above-illustrated video and audio cassettes, but also various other video cassettes, audio cassettes, and computer cartridges which have a similar type of magnetic tape and similar members. In addition, the present invention is also effective in applying to members for use with various diskshaped media such as floppy disks, hard disks, and compact disks as well as cleaning cassettes.

BENEFITS OF THE INVENTION

The present invention provides a plasma-polymerized film having a predetermined metal concentration is formed by depositing and polymerizing a metal element-containing material forming an electrode and a gaseous polymerizable carbon-containing reactant in a plasma atmosphere. The film can be formed to any desired metal concentration and electric conductivity.

The present invention allows the type and content of metal in the film to be selected as desired. The present invention enables incorporation of a noble metal, which could not be incorporated into a film by a conventional plasma polymerizing method using an organometallic compound as reactant gas because of the volatility of the reactant gas.

The present invention allows for outstandingly stable and precise control of the metal content as compared with the use of an organometallic compound as reactant gas.

The present invention allows for very precise and easy control of the film thickness and the metal concentration in a film thickness direction.

A reduction of manufacturing cost and ease of manufacture are expectable because the need for an expensive organometallic compound is eliminated. Additionally, thicker films can be readily produced.

As compared with film forming methods other than plasma polymerization, the present invention provides a conductive film having an increased bond strength to the substrate, density, and mechanical strength, on which another coating can be laminated with ease and an increased bond strength.

The film can also be used as a surface coating for magnetic recording medium including topcoat and backcoat layers by taking advantages of these properties.

The present invention also provides a medium related member having the plasma-polymerized film formed on a surface thereof.

Since the contents of metal and carbon in the film can be changed as desired, the member of the invention has improved properties including significantly high antistatic properties, low friction, and high abrasion resistance.

A carrier using the members of the invention has advantages including antistatic properties, accurate, smooth and stable travel or movement of a recording-/reproducing medium, and minimized dropouts.

The process for preparing a medium related member according to the present invention allows a plasma-polymerized film to be formed without adversely affecting the properties such as strength of a substrate which is often formed of resin, while achieving the above mentioned objects.

The invention allows a wide variety of articles to be processed since a film can be formed on a surface of any complex shaped member.

EXAMPLE

Examples of the present invention are given below to further illustrate the invention. In the examples, SCCM is standard cubic centimeter and G is Gauss.

EXAMPLE 1

Using an apparatus of a basic construction as outlined in FIG. 1, a plasma-polymerized film was formed on a substrate of alkali-free glass. More particularly, a vacuum chamber was evacuated to a vacuum of $10^{-4}$ Pa. A gaseous polymerizable reactant in the form of $CH_4$ gas (at a flow rate of 4 SCCM) and a carrier gas in the form of Ar (at a flow rate of 2 SCCM) were introduced between an electrode 31 and another electrode 35 formed of Cu substantially parallel to the opposed surfaces of the electrodes.

While keeping a gas pressure of 1 Pa, an RF power supply of 1,000 watt, 13.56 MHz was used to create a plasma, with which a polymerized film was formed on the glass substrate.

Upon polymerization, the polymerized film (sample No. 1) was formed under a so-called cross electric/magnetic field where a static magnetic field having an intensity of 600 G at the surface of the polymerized film was applied.

In this example, the W/(F·M) value was calculated $6.3 \times 10^9$ joule/kg.

The polymerized film had a thickness of 360 Å and was analyzed for metal Mt and carbon C contents, finding an Mt/(C + Mt) ratio of 0.88 and a C content of 11.7 at %.

It is to be noted that the distance g of gap between the electrodes 31 and 35 was 3 cm.

Further measurement of the sample gave a surface resistivity of 130 Ω.

The above-described procedure was repeated by changing the flow rate of the gaseous reactant and the power applied to vary the W/(F·M) value as shown in Table 1, with the following results.

TABLE 1

| Sample | W/(F · M) (joule/kg) | Mt/(C + Mt) | C (at %) | Surface resistivity (Ω) |
|---|---|---|---|---|
| 1 | $2.1 \times 10^{10}$ | 0.88 | 11.7 | 130 |
| 2 | $1.7 \times 10^{11}$ | 0.96 | 3.9 | 2 |
| 3 | $6.5 \times 10^8$ | 0.35 | 48 | $2 \times 10^8$ |
| 4 | $1.5 \times 10^7$ | <0.01 | 35 | $>10^{16}$ |

EXAMPLE 2

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 500 Å thick having the properties reported below.

Gaseous reactant (flow rate): $C_2H_6$ (2 SCCM)
Carrier gas (flow rate): Ar (2 SCCM)
Additional gas (flow rate): $NH_4$ (10 SCCM)
Electrode material: Al
Operating pressure: 0.8 Pa
Magnetic field intensity: 600 G

| Sample | W/(F · M) (joule/kg) | Mt/(C + Mt) | C (at %) | Surface resistivity (Ω) |
|---|---|---|---|---|
| 2A | $9.2 \times 10^{10}$ | 0.92 | 7.8 | 20 |
| 2B | $8.0 \times 10^6$ | <0.001 | 32 | $>10^{16}$ |

Sample 2A contained 2 at % of H and 1 at % of N whereas sample 2B contained 67 at % of H.

EXAMPLE 3

The procedure of Example 1 was repeated by changing the gaseous reactant, carrier gas, additional gas, and electrode material as shown below Plasma polymerization was carried out under the following conditions: W/(F·M), operating pressure, and magnetic field intensity, obtaining a polymerized film of 250 Å thick having the properties reported below.

Gaseous reactant (flow rate): $CH_3NH_2$ (20 SCCM)
Carrier gas (flow rate): Ar (2 SCCM)
Electrode material: Cr
Operating pressure: 0.5 Pa
Magnetic field intensity: 1,000 G

| Sample | W/(F · M) (joule/kg) | Mt/(C + Mt) | C (at %) | Surface resistivity (Ω) |
|---|---|---|---|---|
| 3A | $3.5 \times 10^9$ | 0.55 | 42 | $1.2 \times 10^8$ |
| 3B | $1.0 \times 10^7$ | <0.01 | 39 | $>10^{16}$ |

Sample 3A contained 10 at % of H and 4 at % of N.

EXAMPLE 4

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 300 Å thick having the properties reported below.

Gaseous reactant (flow rate): $CHF_3$ (6 SCCM)
Carrier gas (flow rate): Ar (3 SCCM)
Electrode material: Fe
Operating pressure: 2 Pa
Magnetic field intensity: 300 G

| Sample | W/(F · M) (joule/kg) | Mt/(C + Mt) | C (at %) | Surface resistivity (Ω) |
|---|---|---|---|---|
| 4A | $1.5 \times 10^9$ | 0.40 | 45 | $3.5 \times 10^8$ |
| 4B | $1.2 \times 10^7$ | <0.01 | 36 | $>10^{16}$ |

Sample 4A contained 5 at % of F and 20 at % of H.

EXAMPLE 5

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 1,000 Å thick having the properties reported below.

Gaseous reactant (flow rate): tetramethoxysilane (10 SCCM)
Carrier gas (flow rate): $H_2$ (2 SCCM)
Additional gas (flow rate): $O_2$ (4 SCCM)
Electrode material: $In_2O_3$-$SnO_3$
Operating pressure: 1.5 Pa
Magnetic field intensity: 1,000 G

| Sample | W/(F·M) (joule/kg) | Mt/(C + Mt) | C (at %) | Surface resistivity ($\Omega$) |
|---|---|---|---|---|
| 5A | $3.9 \times 10^9$ | 0.35 | 50 | $6.6 \times 10^8$ |
| 5B | $1.3 \times 10^7$ | <0.01 | 33 | $>10^{16}$ |

Sample 5A contained 9 at % of O and 10 at % of Si.

EXAMPLE 6

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 750 Å thick having the properties reported below.
Gaseous reactant (flow rate): $CH_4$ (6 SCCM)
Carrier gas (flow rate): $N_2$ (2 SCCM)
Electrode material: Ti
Operating pressure: 0.5 Pa
Magnetic field intensity: 800 G

| Sample | W/(F·M) (joule/kg) | Mt/(C + Mt) | C (at %) | Surface resistivity ($\Omega$) |
|---|---|---|---|---|
| 6A | $8.8 \times 10^9$ | 0.73 | 25 | $9.6 \times 10^6$ |
| 6B | $9.5 \times 10^6$ | <0.01 | 31 | $>10^{16}$ |

Sample 6A contained 5 at % of H and 2 at % of N.

EXAMPLE 7

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 100 Å thick having the properties reported below.
Gaseous reactant (flow rate): $C_2H_2$ (100 SCCM)
Carrier gas (flow rate): Ar (10 SCCM)
Electrode material: Cu
Operating pressure: 3.5 Pa
Magnetic field intensity: 100 G

| Sample | W/(F·M) (joule/kg) | Mt/(C + Mt) | C (at %) | Surface resistivity ($\Omega$) |
|---|---|---|---|---|
| 7A | $1.8 \times 10^8$ | 0.10 | 56 | $2.7 \times 10^{13}$ |
| 7B | $1.1 \times 10^7$ | <0.01 | 33 | $>10^{16}$ |

Sample 7A contained 38 at % of H.

EXAMPLE 8

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 450 Å thick having the properties reported below.
Gaseous reactant (flow rate): $C_2H_4$ (4 SCCM)
Carrier gas (flow rate): Ar (2 SCCM)
Electrode material: GeTe
Operating pressure: 1 Pa
Magnetic field intensity: 600 G

| Sample | W/(F·M) (joule/kg) | Mt/(C + Mt) | C (at %) | Surface resistivity ($\Omega$) |
|---|---|---|---|---|
| 8A | $2.5 \times 10^{10}$ | 0.67 | 31 | $4.4 \times 10^6$ |
| 8B | $1.1 \times 10^7$ | <0.01 | 32 | $>10^{16}$ |

Sample 8A contained 6 at % of H.

EXAMPLE 9

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 300 Å thick having the properties reported below.
Gaseous reactant (flow rate): $CF_4$ (0.2 SCCM)
Carrier gas (flow rate): Ar (0.1 SCCM)
Electrode material: Ni-Cr
Operating pressure: 0.6 Pa
Magnetic field intensity: 1,000 G

| Sample | W/(F·M) (joule/kg) | Mt/(C + Mt) | C (at %) | Surface resistivity ($\Omega$) |
|---|---|---|---|---|
| 9A | $6.5 \times 10^{11}$ | 0.98 | 1.95 | 110 |
| 9B | $1.2 \times 10^7$ | <0.01 | 34 | $>10^{16}$ |

Sample 9A contained 2 at % of F.

EXAMPLE 10

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 550 Å thick having the properties reported below.
Gaseous reactant (flow rate): vinyl chloride (4 SCCM)
Carrier gas (flow rate): Ar (2 SCCM)
Electrode material: GaAs
Operating pressure: 1 Pa
Magnetic field intensity: 600 G

| Sample | W/(F·M) (joule/kg) | Mt/(C + Mt) | C (at %) | Surface resistivity ($\Omega$) |
|---|---|---|---|---|
| 10A | $2.0 \times 10^9$ | 0.38 | 53 | $3.2 \times 10^8$ |
| 10B | $1.5 \times 10^7$ | <0.01 | 32 | $>10^{16}$ |

Sample 10A contained 7 at % of Cl and 6 at % of H.

EXAMPLE 11

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 1,500 Å thick having the properties reported below.
Gaseous reactant (flow rate): $CH_4$ (3 SCCM)

Carrier gas (flow rate): Ar (2 SCCM)
Electrode material: Cu
Operating pressure: 0.7 Pa
Magnetic field intensity: 600 G

| Sample | W/(F·M) (joule/kg) | Mt/(C + Mt) | C (at %) | Surface resistivity (Ω) |
|---|---|---|---|---|
| 11A | $1.6 \times 10^{10}$ | 0.85 | 14.5 | $1.5 \times 10^3$ |
| 11B | $1.6 \times 10^7$ | <0.01 | 30 | $>10^{16}$ |

Sample 11A contained 3 at % of H.

EXAMPLE 12

The procedure of Example 1 was repeated by changing the gaseous reactant, carrier gas, additional gas, and electrode material as shown below. Plasma polymerization was carried out under the following conditions: W/(F·M), operating pressure, and magnetic field intensity, obtaining a polymerized film of 800 Å thick having the properties reported below.

Gaseous reactant (flow rate): $C_2H_2$ (6 SCCM)
Carrier gas (flow rate): Ar (4 SCCM)
Electrode material: Sm
Operating pressure: 0.7 Pa
Magnetic field intensity: 600 G

| Sample | W/(F·M) (joule/kg) | Mt/(C + Mt) | C (at %) | Surface resistivity (Ω) |
|---|---|---|---|---|
| 12A | $6.5 \times 10^9$ | 0.65 | 32 | $8.1 \times 10^7$ |
| 12B | $6.5 \times 10^7$ | <0.01 | 29 | $\sim 10^{16}$ |

Sample 12A contained 9 at % of H.

EXAMPLE 13

In the preparation of sample No. 2A of Example 2, W/(F·M) was varied from $9.2 \times 10^{10}$ to $4.6 \times 10^9$ joule/kg, obtaining a film having an Mt/(C+Mt) ratio continuously varying from 0.92 to 0.63 from the substrate side to the surface side.

EXAMPLE 14

In the preparation of sample No. 4A of Example 4, W/(F·M) was varied from $1.5 \times 10^9$ to $1.5 \times 10^{10}$ joule/kg, obtaining a film having an Mt/(C+Mt) ratio continuously varying from 0.55 to 0.86 from the substrate side to the surface side.

EXAMPLE 15

Using an apparatus as shown in FIG. 1, plasma-polymerized films of 200 Å thick as reported in Table 2 were formed on the surface of a polyethylene terephthalate (PET) sheet of 30 μm thick.

The material of which the electrodes 31 and 35 shown in FIG. 1 were formed is reported in Table 2.

The gaseous reactant and conditions for plasma polymerization are also shown in Table 2.

The composition of the plasma-polymerized film was measured by SIMS.

The thus coated sheet was electrically charged to 5,000 volts and then measured for a half life of the charged potential.

The results are shown in Table 3.

For comparison purposes, a sheet of the same material and thickness, but free of a plasma-polymerized film was similarly tested. The results are also shown in Table 3.

TABLE 2

| Plasma polymerized film No. | 11 | 12 | 13* |
|---|---|---|---|
| Electrode material | Cu | Fe | Cu |
| Gas reactant/carrier gas | $CH_4$/Ar | $CHF_3$/Ar | $CH_4$/Ar |
| Flow rate (SCCM) | 4/2 | 6/3 | 400/200 |
| W/F·M | $1.7 \times 10^{11}$ | $1.5 \times 10^9$ | $1.7 \times 10^7$ |
| Mt/(C + Mt) | 0.96 | 0.40 | <0.001 |
| Magnetic field (G) | 600 | 300 | 600 |
| Operating pressure (Pa) | 1 | 2 | 700 |
| Plasma frequency (MHz) | 13.56 | 13.56 | 13.56 |

TABLE 3

| Plasma polymerized film No. | 11 | 12 | 13* | Control |
|---|---|---|---|---|
| Half life (sec.) | 0.5 | 1 | 60 | — |

*outside the scope of the invention

As seen from Table 3, the plasma-polymerized film sample Nos. 11 and 12 of the present invention had a reduced half life of charged potential as compared with sample No. 13 outside the scope of the invention, indicating superior antistatic properties.

The control sample having no plasma-polymerized film was unmeasurable since the charge potential remained unchanged.

EXAMPLE 16

Using an apparatus as shown in FIG. 1, plasma-polymerized films of 500 Å thick as identified in Table 2 were formed on the surface of a stainless steel post of 4 mm diameter. The plasma-polymerized films were the same as in Example 15.

The coated posts were measured for coefficient of friction.

The results are shown in Table 4.

For comparison purposes, a post of the same material and size, but free of a plasma-polymerized film and a post of polyoxymethylene (POM) free of a plasma-polymerized film were similarly tested. The results are also shown in Table 4.

TABLE 4

| Plasma-polymerized film No. | Coefficient of friction μ |
|---|---|
| 11 | 0.22 |
| 12 | 0.21 |
| 13 | 0.27 |
| Control | 0.27 |
| POM | 0.37 |

As seen from Table 4, the plasma-polymerized film sample Nos. 11 and 12 of the present invention had a low coefficient of friction as compared with sample No. 13 outside the scope of the invention and conventional samples free of a plasma-polymerized film, indicating superior dynamic operating stability.

It is to be noted that the coefficient of friction μ is desired to be 0.25 or lower because smooth operation is not expected with higher coefficients of friction.

EXAMPLE 17

The same plasma-polymerized films as in Examples 15 and 16 were formed on the surface of the following members:
leader tape section 121 (formed of PET),
guide post 151 (formed of POM),
tape pad 152 (formed of PET),
tape guide 153 (formed of POM), guide roller 154 (formed of POM), and
reel center boss 1333 (formed of POM).
They were assembled into a video cassette as shown in FIG. 2. The plasma-polymerized film had a thickness of 500 Å.

The tape used was a PET film of 145 μm thick having a magnetic layer of cobalt-doped $\gamma$-Fe$_2$O$_3$ magnetic powder formed thereon.

For each of video cassettes, the components had the same plasma-polymerized film.

The thus fabricated video cassette samples were subjected to the following test.

(1) Dropout

Each sample was measured for dropout at the initial and after a 200-pass endurance test at 60° C., 90% RH.

The measurement method was by counting dropouts per minute on the video tape of standard 120-min length and calculating the average.

The result is an average of measurements on ten video cassettes for each lot.

The results are shown in Table 5.

TABLE 5

| Cassette sample No. | Plasma-polymerized film No. | Dropout, average count Initial | After test |
| --- | --- | --- | --- |
| C1 | 11 | 8.01 | 8.53 |
| C2 | 12 | 7.89 | 8.15 |
| C3 | 13 | 8.52 | 22.67 |
| C4 | none | 8.87 | 28.31 |

In the test, each lot was rejected for commercial use if a count of more than 20 dropouts was recorded once or more for even one of the cassettes in the lot. For the lots according to the present invention, a count of more than 20 dropouts was not recorded at all.

In actual operation, the dropout canceller performs well so that less than 20 dropouts are not visually noticed.

EXAMPLE 18

The same plasma-polymerized films as in Examples 15 and 16 were formed on the surface of the following members:
leader tape section 221 (formed of PET, 125 μm thick),
sheet 261 (formed of PET, 35 μm thick),
guide pin 241 (formed of SUS), and
guide roller 243 (formed of POM).
They were assembled into an audio cassette as shown in FIG. 3. The plasma-polymerized film had a thickness of 500 Å.

The tape used was in the form of a PET film of C-90 length having a magnetic layer of cobalt-doped $\gamma$-Fe$_2$O$_3$ magnetic powder formed thereon.

For each of audio cassettes, the components had the same plasma-polymerized film.

The thus fabricated audio cassette samples were subjected to the following test.

(1) Level-down

Each sample was measured for level-down after a 200-pass endurance test at 60° C., 90% RH.

The test used a level recorder Model 2307 of B & K Company without a filter and involved recording and reproducing of a signal of 10 kHz at a chart speed of 0.3 mm/sec.

For each lot, ten cassettes were examined for reproduced signals before and after the endurance test. The cassette was evaluated "Rejected" if a level-down of more than 3 dB as compared with the value before the test was recorded once or more over the entire length of tape, but evaluated "Pass" if no such level-down was recorded.

The results are shown in Table 6.

TABLE 6

| Cassette sample No. | Plasma-polymerized film No. | Level-down |
| --- | --- | --- |
| C11 | 11 | Pass |
| C12 | 12 | Pass |
| C13 | 13 | Rejected |
| C14 | none | Rejected |

The foregoing results demonstrate the effectiveness of the present invention.

We claim:

1. A coated article, wherein a plasma-polymerized, metal element-containing film is formed on said article by a process comprising:
   (i) passing a gaseous polymerizable reactant containing carbon C between electrodes formed of a material containing a metal element Mt; and
   (ii) depositing and polymerizing the metal from said material and said polymerizable reactant in a plasma atmosphere, on said article,
   wherein said process is carried out under a condition such that W/(F·M) is at least $10^8$ joule/kg wherein W is the power applied for plasma generation in joule/sec, F is the flow rate of the gaseous reactant, and M is the molecular weight of the gaseous reactant, F·M being expressed in kg/sec, and
   wherein said plasma-polymerized film contains the metal element Mt and carbon c in an atomic ratio Mt/(C+Mt) of at least 1/100.

2. The coated article according to claim 1, wherein said plasma-polymerized film has a thickness of 10 to 1,000 Å.

3. A plasma polymerized film, produced by a process comprising the steps of:
   passing a gaseous polymerizable reactant containing carbon C between electrodes formed of a material containing a metal element Mt, and
   depositing and polymerizing the metal from said material and said polymerizable reactant in a plasma atmosphere such that said film contains the metal element Mt and carbon C in an atomic ratio, Mt/(C+Mt), of at least 1/100,
   and wherein said process is carried out under a condition such that W/(F·M) is at least $10^8$ joule/kg wherein W is the power applied for plasma generation in joule/sec, F is the flow rate of the gaseous reactant, and M is the molecular weight of the gaseous reactant, F·M being expressed in kg/sec.

4. The polymerized film of claim 3 wherein Mt/(C+Mt) is in the range of from 5/100 to 99.9/100.

5. A process for preparing a coated article, comprising:
   (i) passing a gaseous polymerizable reactant containing carbon C between electrodes formed of a material containing a metal element Mt; and
   (ii) depositing and polymerizing the metal from said material and said polymerizable reactant in a plasma atmosphere, on said article, wherein said process is carried out under a condition such that W/(F·M) is at least $10^8$ joule/kg wherein W is the power applied for plasma generation in joule/sec, F is the flow rate of the gaseous reactant, and M is the molecular weight of the gaseous reactant, F·M being expressed in kg/sec, and wherein said plasma-polymerized film contains the metal element Mt and carbon C in an atomic ratio Mt/(C+Mt) of at least 1,100.

6. A process for preparing a plasma-polymerized film, comprising passing a gaseous polymerizable reactant containing carbon C between electrodes formed of a material containing a metal element Mt, and depositing and polymerizing the metal from said material and said polymerizable reactant in a plasma atmosphere, wherein said process said process is carried out under a condition such that W/(F·M) is at least $10^8$ joule/kg wherein W is the power applied for plasma generation in joule/sec, F is the flow rate of the gaseous reactant, and M is the molecular weight of the gaseous reactant, F·M being expressed in kg/sec, and wherein said plasma-polymerized film contains the metal element Mt and carbon C in an atomic ratio Mt/(C+Mt) of at least 1/100.

7. The process for preparing a plasma-polymerized film according to claim 6 which further includes applying a magnetic filed to the plasma atmosphere.

8. The process for preparing a plasma-polymerized film according to claim 6 wherein formation of the plasma-polymerized film is carried out under an operating pressure of up to 5 Pa.

* * * * *

UNITED STATES PATENT AND TRADEMARK OFFICE
CERTIFICATE OF CORRECTION

PATENT NO. : 5,068,146
DATED : November 26, 1991
INVENTOR(S) : Nakayama, et. al.

It is certified that error appears in the above-indentified patent and that said Letters Patent is hereby corrected as shown below:

Column 19, claim 5, line 6, "1,100", change to --1/100--.
Column 19, claim 6, line 14, "said process" occurs twice, delete second occurrence.

Signed and Sealed this

Fifteenth Day of June, 1993

Attest:

MICHAEL K. KIRK

Attesting Officer

Acting Commissioner of Patents and Trademarks